July 19, 1927.                S. LANNOM, JR                1,636,518
                              BASEBALL CENTER
                            Filed July 24, 1924

Witness
Kakusher

Inventor
Sharp Lannom Jr.
by Bair & Freeman Attys.

Patented July 19, 1927.

1,636,518

UNITED STATES PATENT OFFICE.

SHARP LANNOM, JR., OF GRINNELL, IOWA, ASSIGNOR TO LANNOM MANUFACTURING COMPANY, OF GRINNELL, IOWA, A CORPORATION OF TENNESSEE.

BASEBALL CENTER.

Application filed July 24, 1924. Serial No. 727,897.

The object of my invention is to provide a baseball center of novel and efficient structure.

More particularly, my object is to provide a base ball center having a hollow, central, member or core filled with air, compressed air, gas or liquid and received within a compressed resilient casing.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Figure 2:
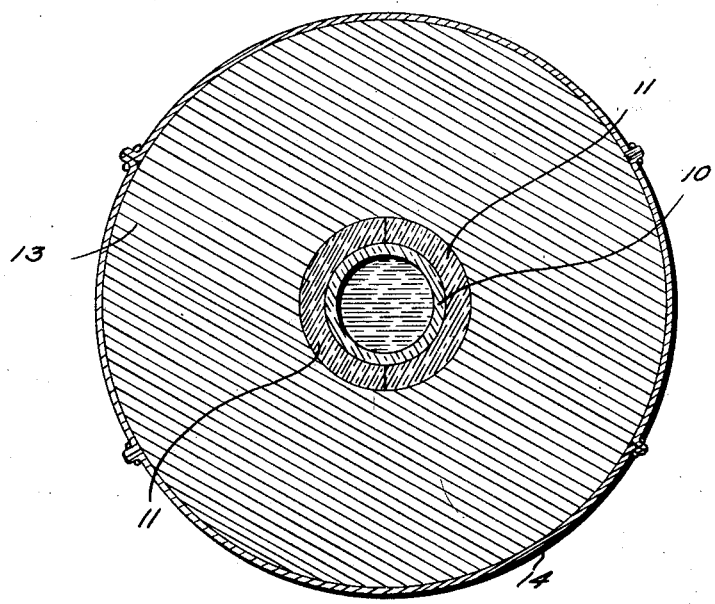
Figure 2 shows a vertical, central, sectional view through a base ball having a center embodying my invention.

In the accompanying drawings, I have used the reference numeral 10 to indicate generally a hollow, spherical, central member which is preferably made of hard rubber or gutta percha, and can be filled with air, compressed air, gas or other liquid, preferably under pressure.

The hard rubber core 10 is surrounded by a receiving member which may be composed of two hollow hemispheres 11 with their edges pressed together and sealed. The members 11 are preferably made of resilient rubber and are compressed around their central member 10.

Figure 3:
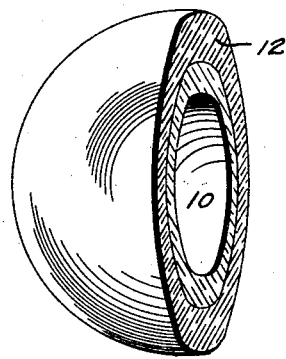
Figure 3 shows a perspective, sectional view, through a center of a slightly modified form.
Figure 1:
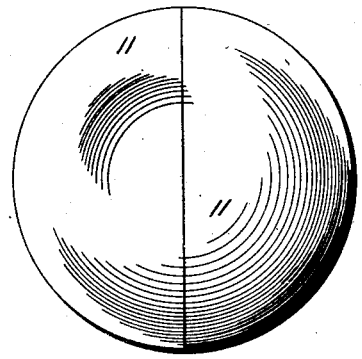
Figure 1 shows a side elevation of the base ball center embodying my invention.

In Figure 3, I have shown a slightly different form of the invention in which the enveloping member for the central member 10 is indicated at 12, and is formed of a homogenous mass compressed on the central member.

For illustration, I have shown in Figure 2, the material 13 surrounding the base ball center having the ordinary cover 14.

It will be understood that the interior core or center member 10 is made of hard material, such for instance, as a hard rubber, by any suitable manufacturing process and is filled with air, gas, compressed air, compressed gas or other liquid.

Surrounding the center member 10 is the compressed casing, which may be made in two hollow hemispherical halves 11 with their edges secured together under pressure. This enveloping member is preferably made of compressed rubber and has some resiliency. The enveloping member may be made of a single mass as manufacturing conditions may dictate.

Some variations may be made in the exact details of structure of my improved base ball center and in the process or method of manufacturing employed in making the same, and it is my intention to cover by the claim of the patent to be issued for this application, any modified forms of structure or use of mechanical equivalents which may be included within the real scope of my invention and the claim of said patent.

I claim as my invention:

In a base ball, a hollow hard rubber core having fluid under pressure contained therein, a resilient casing comprising hollow hemispheres for enclosing said inner core, a relatively thick enveloping body for enveloping and causing compressions of the resilient casing, and a flexible covering for the enveloping body.

SHARP LANNOM, JR.